T. W. HICKS.
TILLER.
APPLICATION FILED AUG. 21, 1916.
1,320,469.
Patented Nov. 4, 1919.
2 SHEETS—SHEET 1.
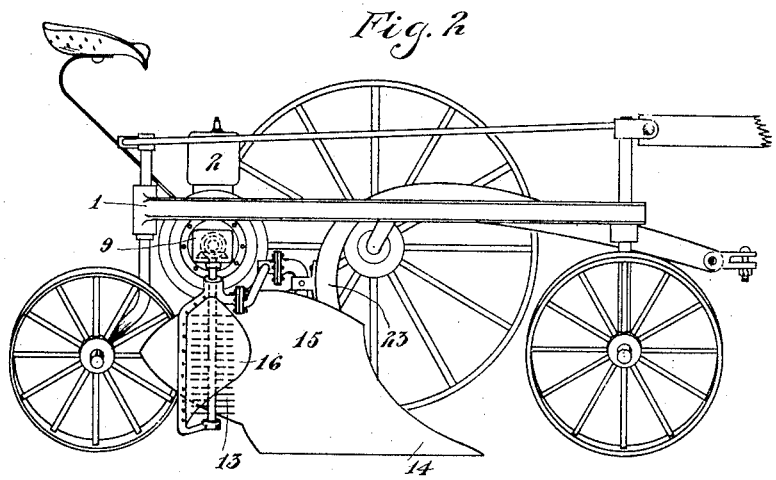
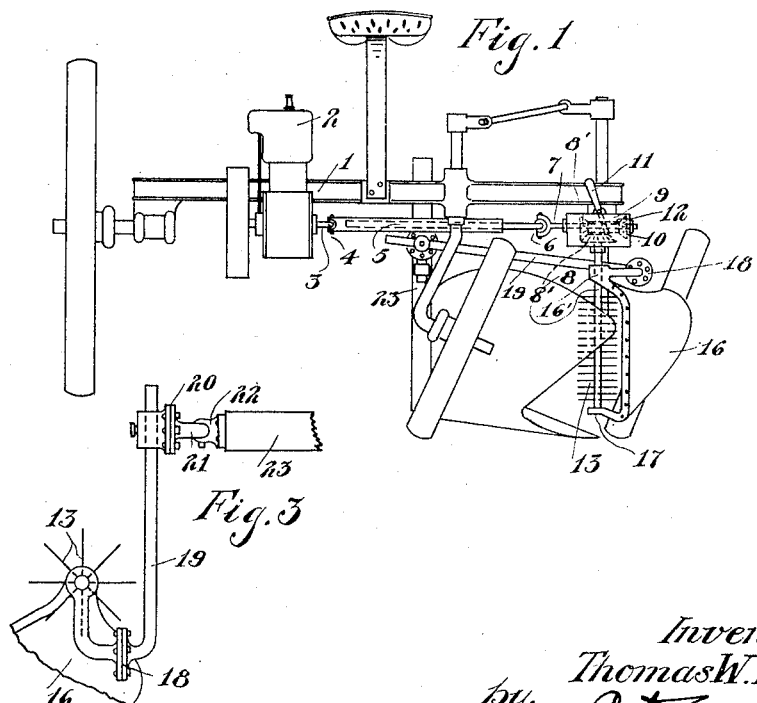
Inventor:
Thomas W. Hicks.
by, C. D. Enochs
Attorney.

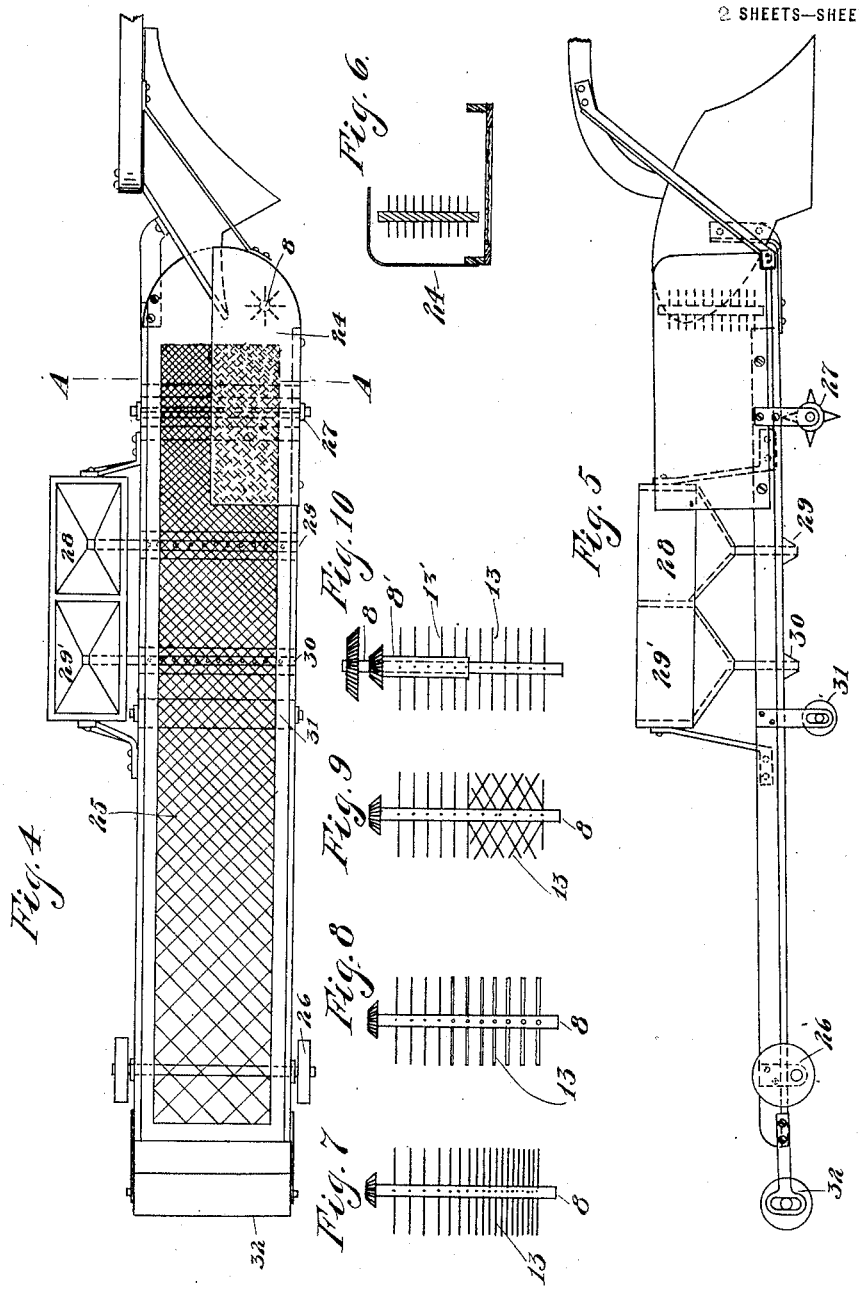

UNITED STATES PATENT OFFICE.

THOMAS W. HICKS, OF MINNEAPOLIS, MINNESOTA, ASSIGNOR TO SCIENTIFIC FARM-
ING MACHINERY COMPANY, OF MINNEAPOLIS, MINNESOTA, A COMMON LAW
COMPANY.

TILLER.

1,320,469.  Specification of Letters Patent.   Patented Nov. 4, 1919.

Application filed August 21, 1916.  Serial No. 116,148.

*To all whom it may concern:*

Be it known that I, THOMAS W. HICKS, a citizen of the United States, residing at Minneapolis, in the county of Hennepin and State of Minnesota, have invented certain new and useful Improvements in Tillers, of which the following is a specification.

One object of my invention is to provide a tiller which may be used in conjunction with the ordinary type of plow for pulverizing the soil turned by the plow.

Another object of my invention is to provide means for reversing the direction of rotation of the tiller.

Another object of my invention is to provide means for adjusting the tiller in any desired relative position with the plow.

Another object of my invention is to provide means for driving the tiller from any source of power.

Another object of my invention is to provide a tiller of such design that it may be used independently of the plow share.

Another object of my invention is to provide means whereby the soil pulverized by the tiller, whether used with or without the plow share, may be deposited on the subsoil in strata of uniform size of granules.

Another object of my invention is to provide means for puncturing the subsoil where a portion of the soil has been lifted either by the plow or by the tiller directly and deposit the pulverized soil back onto the punctured subsoil so as to give a more intimate binding between the subsoil and the pulverized soil.

Another object of my invention is to provide a screen for positively positioning the various sizes of granules of pulverized soil and means for agitating the screen to facilitate the working of the pulverized soil over the screen.

With these and incidental objects in view, the invention consists of certain novel features of construction and combination of parts, the essential elements of which are hereinafter described with reference to the drawing which accompanies and forms a part of this specification.

In the drawings, Figure 1 is an end view of a portion of a common type of plow with my tiller attached thereto. Fig. 2 is a side elevation of a portion of the same plow and Fig. 3 is an enlarged detail of the adjustable rotor support.

Fig. 4 is a plan view of the plow, rotor, screen, seeding and fertilizing attachments, and Fig. 5 is a side elevation of the same.

Fig. 6 is a section taken on the line AA, Fig. 4, and Fig. 7 is a side elevation of my preferred construction of rotor.

Fig. 8 is a side elevation of a modification thereof. Fig. 9 is a still further modification thereof. Fig. 10 is a still further modification, the four types shown being adapted, however, to accomplish the same result.

While I have shown in the drawings means of attachment of my rotor to a plow, and while this is my preferred construction, it is evident that the plow share and mold board may be removed from the plow and the rotor positioned substantially horizontally and used to good purpose without the plow share.

While I am aware that tillers have been built using a rotor, I believe myself to be the first to combine a rotor with a plow share and also to be the first to provide means of any kind whatsoever for preparing the seed bed, introducing seed and fertilizer into the soil as required for ideal soil preparation and shall claim broadly all of the features incidental to these basic principles.

I have determined that the ideal soil preparation and seeding should incorporate the following conditions:

The soil to a certain depth should be worked in some manner so as to be in a finely pulverized condition, and for most crops the granules of the pulverized soil should be smaller at the bottom or root section of the completed bed and increase in size to the surface section of the bed.

Moreover, the subsoil, or under surface from which the soil has been removed to be worked, and upon which it has been deposited, should be punctured so as to give a more intimate relation between the root section and subsoil.

The seed should be deposited into the prepared bed at a uniform depth and among granules of the proper size for the seed used.

Fertilizer should be deposited at a uniform depth below or above the seed, or both, and when the seed has been deposited and a small amount of pulverized dirt deposited thereover, the root section should be packed and the remainder of the soil then deposited on the packed root section.

In my tiller, I have provided means for accomplishing all of these conditions with a single machine and by only going over the field once.

For convenience, this specification is divided into three headings covering the main operations performed by the tiller.

*Plowing and pulverizing.*

In the drawings, 1 is the ordinary plow frame and 2 is a gasolene engine carried thereon.

Driven by the engine shaft 3 through universal joint 4, splined shaft connection 5, universal joint 6 and driving shaft 7, the rotor shaft 8 may be driven either clockwise or anti-clockwise through the engagement of the pinions 9 and 10, respectively, with the driving gear 8'.

A gear shift lever 11 controlling the sleeve 12, carrying the pinions 9 and 10, splined to the driving shaft 7 facilitates the reversal of the rotor shaft. Carried on the rotor shaft 8 is a plurality of prongs 13, better shown in Fig. 3, and when the soil turned by the plow share 14 and mold board 15 is brought into contact with the prongs 13, which are driven at a comparatively high velocity, the soil is pulverized, and any roots or litter finely disintegrated and sent upward and backward against the shield 16 from which the soil, in its pulverized condition, falls in a uniform shower back to the surface of the subsoil.

The rotor shaft is journaled in the frame at 16' and 17 and this frame is supported by an adjustable bracket comprising a flange connection 18, Fig. 3, an arm 19, a flange connection 20, an L shaped adjustable arm 21, and an adjustable bracket 22 bolted to the frame member 23.

It is evident that the flange connections 18 and 20 in conjunction with the adjustable bracket 22 and L shaped arm 21 will allow the rotor shaft to be positioned at practically any angle with the mold board so that soil may be taken from the mold board by the prongs 13 with the rotor turning in an anti-clockwise direction as shown in Fig. 3; the rotor may be laid in a horizontal position at the end of the mold board and receive the soil from the mold board while turning in an anti-clockwise direction, in which case the soil would be turned directly downward; the rotor may be positioned horizontally and turned in a clockwise direction thereby throwing the soil upward and backward, or the rotor may be positioned substantially vertical and rotate in a clockwise direction in Fig. 3.

It is evident that when the rotor is positioned horizontally, the plow share 14 and mold board 15 may be completely omitted, as the rotor will in itself tear the soil and throw it upwardly and backwardly without the assistance of the plow share.

*Stratifying top soil and puncturing subsoil.*

For most seed beds, it is preferable to have the pulverized soil deposited back onto the subsoil so that the finer granules rest on the subsoil and form a root section and the coarser granules are deposited thereon in gradually increasing size to the surface of the completed bed, forming the surface section.

By utilizing types of rotors, as shown in Figs. 7, 8, 9, and 10, I have accomplished this result.

In Fig. 7, the rotor shaft 8 carries thereon the prongs 13 which are spaced closer along the shaft at the bottom than at the top, while in Fig. 8, the prongs are uniformly spaced but increase in size toward the bottom end of the rotor and in Fig. 9 the prongs in the lower end of the rotor shaft extend at an acute angle thereto instead of at 90 degrees as in the upper half so in all of the types the soil would be pulverized more finely at the lower end.

In Fig. 10, the rotor shaft 8 has a sleeve 8' journaled thereon and the sleeve 8' carries prongs 13', whereas the rotor shaft carries prongs 13.

By driving the shaft and sleeve at different speed, it is evident that the soil will be pulverized into granules of different sizes by the two different sections of the rotor.

It is also evident that the rotor will throw the larger granules farther than the smaller granules so they will fall back onto the subsoil with the finer granules falling first but being covered by the coarser granules as the tiller is drawn forwardly.

It is evident that the adjustable rotor may be entirely reversed and the coarser granules be thrown from the bottom of the rotor if desired and thus any possible condition of soil working may be obtained from the rotor.

Another means of stratifying which can be worked with any type of rotor or tiller is shown in Fig. 4 in which the rotor shaft 8 is positioned vertically, although it may be positioned in any manner and perform the functions desired.

A shield 24 serves to throw the pulverized soil onto the forward end of the screen 25 from which end it may be worked by any suitable means backwardly along the screen, which it will be noted, is of a fine mesh toward the front end and of a coarse mesh toward the rear end, to allow various sizes of pulverized soil to pass through it at different points along its length.

An eccentrically mounted pair of wheels 26 support the rear end of the screen and serve to assist in working the soil backwardly over the face of the screen by agitating the screen proper.

It is evident that with this screen soil of small granules will be dropped from the front end and covered by the larger sizes of granules as the tiller is drawn forwardly.

A spiked roller 27, or a series of disks, if preferred, follow the rotor shaft and puncture the subsoil before the pulverized soil is dropped back thereon so the finely pulverized soil will drop into the holes or slots made in the subsoil and establish a more intimate relation between the subsoil and the root section of the seed bed.

*Seeding, fertilizing, and packing.*

A hopper 28 having dropping means 29, will deposit seed and as a portion of the finer worked soil has been dropped through the screen between the hopper 28 and the forward end of the screen, this seed will be deposited in a plane at a uniform depth from the surface of the subsoil and will be covered by the pulverized soil dropped from the back portion of the screen as it passes over the surface where the seed has been dropped.

A second hopper 29', with dropping attachment 30, will deposit suitable fertilizer as the machine is drawn forward, and it is evident the seed will be covered by a certain definite amount of pulverized soil before the fertilizer is deposited and that the fertilizer will in turn be covered by a definite amount of soil.

A weighted roller 31 follows and packs the root section which then receives the remainder of the pulverized soil on the packed root section and the finished seed bed may be packed by an additional weighted roller 32 if desired.

It is evident that any desired number of hoppers for fertilizer may be used and these may be positioned in front of, as well as behind, the seeding attachment.

The ideal arrangement would possibly be to deposit one type of fertilizer near the subsoil to which the roots of the planted grain would penetrate, deposit a different kind of fertilizer with, or in a plane close to the seeds, the deposit still a different kind of fertilizer considerably above the seed for the rain to percolate through down to the seeds.

While I have described my invention and illustrated it in several forms, I do not wish myself to be understood as confining myself to these particular constructions, as it is evident that my invention may be embodied in various ways and different constructions within the scope of the following claims:

1. The combination with a plow having a mold board for turning a furrow, of a soil disintegrator mounted to rotate on an approximately upright axis, on the furrow side of said plow in such position that the raised furrow will be turned against the same, the space between said rotary disintegrator and the mold board of the plow being clear and unobstructed for the free discharge of the disintegrated soil, and a motor carried with the plow and connected to said soil disintegrator for rotating the same.

2. The combination with a plow having a mold board for turning a furrow, of a soil disintegrator mounted to rotate on an approximately upright axis on the furrow side of said plow in such position that the raised furrow will be turned against the same, the space between said rotary disintegrator and the mold board of the plow being clear and unobstructed for the free discharge of the disintegrated soil, and a motor carried with the plow and connected to said soil disintegrator for rotating the same, the driving connections between said motor and disintegrator being such that the latter will be rotated in a direction toward and through the disintegrated soil directly rearward from the rear portion of said mold barrel, thereby lessening the draft on said mold board.

3. In a tiller, means for pulverizing the soil into granules of different sizes, means for selecting and depositing onto the earth the subsoil so pulverized with the finer granules deposited directly on the subsoil and the granules of larger size deposited on the smaller granules in increasing sizes toward the top of the subsoil so deposited.

4. In a tiller attachment for plows, the combination of a rotary element, multiple prongs carried by said rotary element, a splined collar, associated with said rotary element having two bevel gears thereon, a driving bevel gear associated with said splined collar, a driving shaft carrying said driving bevel gear, a universal joint on the other end of said driving shaft, an intermediate shaft having a splined connection therein, a prime mover having a shaft therein and universal joint connections between said prime mover shaft and one end of said splined intermediate shaft, and between the other end of said splined intermediate shaft and said driving shaft.

5. In a tiller attachment, the combination with a rotor element of graduated means for pulverizing soil into granules of different size and depositing said soil in strata of different sized granules.

6. In a tiller, the combination of a screen having a mesh therein of graduated sizes, and means for pulverizing soil into granules of different sizes and depositing the soil so pulverized onto the finer mesh screen.

7. In a tiller, the combination of a screen having a mesh therein of graduated sizes, means for pulverizing soil into granules of different sizes and depositing the soil so pulverized onto the finer mesh screen, and means for working the pulverized soil over the surface of said screen to where the different sized granules pass through said screen at the corresponding meshes in said screen.

8. In a tiller, the combination of means for working the upper portion of the soil and depositing it back on the sub-soil, and means for puncturing the sub-soil before the soil worked is turned back onto the subsoil.

9. In a tiller the combination of means for lifting a portion of soil, means for puncturing the subsoil from which said portion has been lifted, and means for pulverizing the lifted soil and depositing it back onto the punctured subsoil.

THOMAS W. HICKS.

Copies of this patent may be obtained for five cents each, by addressing the "Commissioner of Patents, Washington, D. C."